2,782,290

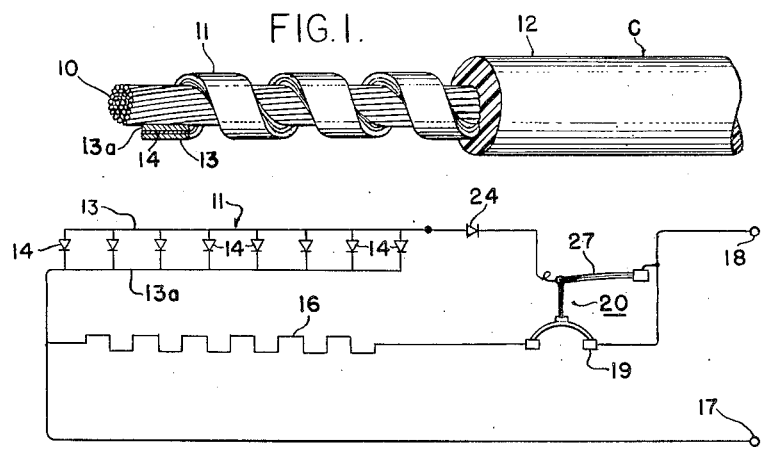
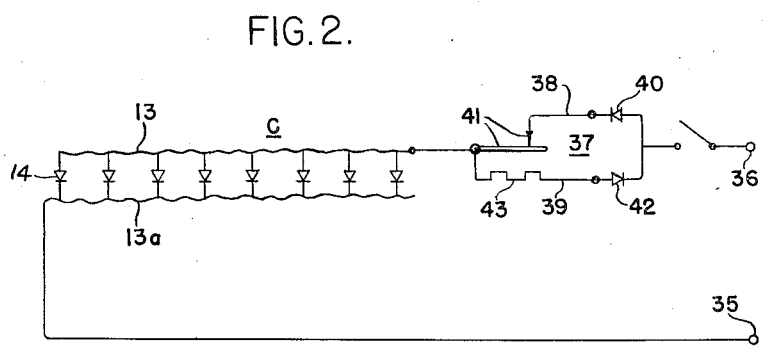
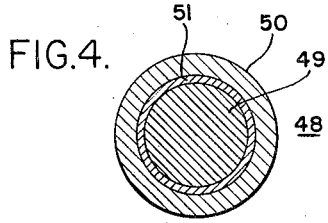
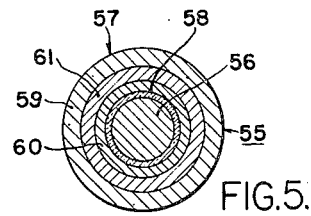
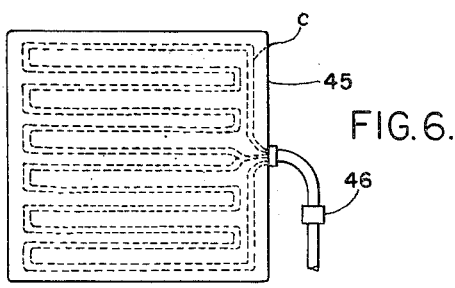
INVENTORS
PATRICK E. LANNAN,
CHARLES E. FREESE.
BY
ATTORNEY United States Patent Office 2,782,290
Patented Feb. 19, 1957

TEMPERATURE RESPONSIVE CONTROL DEVICE

Patrick E. Lannan, Cleveland, and Charles E. Freese, Parma, Ohio, assignors to Westinghouse Electric Corporation, East Pittsburgh, Pa., a corporation of Pennsylvania Application September 28, 1954, Serial No. 458,849

6 Claims. (Cl. 219—20)

The present invention relates to a temperature responsive device in cable form for controlling energization of bed coverings or other fabrics. An object of the invention is to provide an improved temperature sensing device of this kind.

A further object of the invention is to provide an improved temperature sensing device utilizing a rectifying material whose rectifying property varies with temperature.

Another object of the present invention is to provide a new and improved temperature control system in which current flowing through a heating element is controlled by a rectifying material substantially co-extensive with the element and subjected to the temperature to be controlled and having a negative temperature coefficient of rectification, whereby current flowing in one direction to the heating device may be utilized as the main heating current and current flowing in the opposite direction utilized as a control current.

Another object of the present invention is the provision of a new and improved heating system including an electrical heating element comprising a heating conductor and rectifying material associated with the conductor for controlling the direction of current in the conductor, and control means for controlling the energization of the heating element, the control means being responsive to current flowing in the direction normally blocked by the rectifying material and the main heating current to the element flowing in the opposite direction.

Fig. 1 is a perspective view partly cut away of a temperature sensing element utilized as the temperature control means for the fabric;

Fig. 2 is a circuit diagram showing connections for using the element of Fig. 1 as a temperature sensing element;

Fig. 3 is a circuit diagram showing the electrical connections for the element of Fig. 1 when used as a combined heating and temperature sensing device;

Fig. 4 is a sectional view of an alternative construction for the temperature sensing element or combined heat and temperature sensing device of Fig. 1;

Fig. 5 is a sectional view illustrating a second alternative construction for a combined temperature sensing and heating device suitable for use with the present invention; and Fig. 6 is a plan view of an electrically heated fabric constructed according to the present invention.

The present invention contemplates utilizing the change in the rectifying property with temperature of rectifying materials to protect an electrically heated blanket or other fabric from overheating. The use of rectifying materials to control the temperature of the fabric enables relatively large control currents and simplified control circuits to be obtained, a lower cost temperature sensing element in cable form to be acquired, and the provision of a fabric or blanket in which the electric wires and sensing element are unobtrusive to the user.

Referring to the drawings, the preferred form of the temperature sensing element or the combined temperature sensing and heating cable C is illustrated in Fig. 1 and comprises a stranded core 10 of flexible insulating material such as fibrous-like jute, flax or other similar material having the temperature sensing element 11 wound thereon. The temperature sensing element is protected by a suitable outer covering 12 which may be a polyvinyl chloride or any other suitable plastic having the necessary flexibility and protective properties.

The temperature sensing element 11 comprises two ribbon-type conductors 13, 13a separated by a continuous layer of rectifying material 14 in intimate electrical contact with both conductors and having a negative temperature coefficient of rectification. As used throughout this specification the term "negative temperature coefficient of rectification" refers to materials which are relatively non-conducting in one direction but readily pass current in the other direction, the resistance of the material to current flowing in its relatively non-conducting direction decreasing with an increase of temperature. It has been found, by way of example, that a rectifying material comprised of selenium, copper oxide, germanium or silicon is suitable for use with the present invention. It will be understood, however, that any rectifying material which exhibits the characteristic of a negative temperature coefficient of rectification may be utilized.

The cable may be easily assembled, especially when copper oxide is used, since copper oxide will exhibit the necessary characteristics as long as it is merely mechanically held between the ribbon conductors 13 and 13a. The sensing element 11 may be assembled first and then wound on the core 10, after which the coating 12 is easily applied.

A temperature sensing element constructed as illustrated in Fig. 1 may be made extremely small and flexible and is particularly suitable for use as a sensing element in electrically heated fabrics, such as blankets or clothing. The element may be liberally interspersed throughout the fabric so as to respond to temperature changes at any point in the fabric.

Fig. 2 is an electrical circuit diagram for a blanket or fabric utilizing the temperature sensing element of Fig. 1 as an overheat protective device. The blanket is provided with a heating element 16 having one side connected to a terminal 17 of a pair of terminals 17, 18 for applying A. C. power to the system and having its other side connected to terminal 18 through normally closed contacts 19 of a circuit breaker 20. The temperature sensing element 11 of cable C is generally coextensive with the heating element 16 and connected in parallel with the heating element 16. One end of the conductor 13a of the temperature sensing device 11 is connected to the terminal 17 while the opposite end of the conductor 13 of the temperature sensing device is connected to the terminal 18 through a unidirectional conducting device 24, and a thermal actuating element 27 for the circuit breaker 20. The thermally actuated circuit breaker 20 is of the type in which the normally closed contacts 19 are opened when the current through the thermal element 27 reaches a predetermined magnitude. The layer of rectifying material 14 is shown diagrammatically in Fig. 2 as a plurality of rectifying elements in parallel between conductors 13 and 13a.

The operation of the heating system of Fig. 2 is as follows: Normally the device 24 and the rectifying material 14 prevent an appreciable flow of current through the thermal element 27 of breaker 20. As the temperature in an area of the temperature sensing element 11 increases, the back resistance of the rectifying material intermediate the conductors 13 and 13a is lowered and increased current will flow through the material in its relatively non-conducting direction, and also through the thermal actuating element 27 of circuit breaker 20. The increased current through the thermal actuating element 27 will cause operation of the circuit breaker 20 to open the operation contacts 19 of circuit breaker 20 which operation deenergizes the heating element 16. The circuit breaker will remain open as long as sufficient current is passed by the temperature sensing device 11 to maintain the thermal actuating element 27 at the temperature necessary to open the circuit breaker 20. When the temperature sensing element 11 cools sufficiently, the current through the rectifying layer 14 and thermal element 27 diminishes. Accordingly, the latter cools to a point where the circuit breaker 20 will close to again energize the heating element 16. It will be noted that the rectifying material 14 may pass current under normal conditions as long as its magnitude is not sufficient to operate circuit breaker 20.

The primary use of the control system described is as an over temperature control and it may be used in conjunction with any cycling device or other temperature control device to control the normal operation of heating element 16.

The cable C is preferably utilized as both a heating element and a temperature sensing element. The circuit of Fig. 3 illustrates how circuit connection to the cable may be made when used for both heating and temperature detecting.

Referring to Fig. 3, one end of conductor 13a of the cable C is connected to a terminal 35 of a pair of terminals 35, 36 for supplying A. C. power to the system and the opposite end of the conductor 13 is connected to the other terminal 36 through parallel circuit means 37 for controlling the energization of the cable C. The control means 37 has two parallel connected branches 38, 39, the branch 38 including a unidirectional conducting device 40 and thermally operated contacts 41. The branch 39 includes a unidirectional conducting device 42 and a heater element 43 for the thermally operated contacts 41. The unidirectional conducting device 40 passes current flowing in the normally conducting direction of the rectifying material 14 while the device 42 passes current flowing in the relatively non-conducting direction of the material. Under normal conditions the current flow in the system is from the terminal 36 through the parallel branch 38 and the cable C to the terminal 35. Current is effectively prevented from flowing in the opposite direction due to the blocking effect of the rectifying material 14. Upon a rise in temperature, the material 14 will present less resistance to current flowing from the terminal 35 to the terminal 36, which current flows through cable C and the branch 39 of control means 37. This increased flow of current in branch 39 increases energization and temperature of the heater element 43 for the thermally operated contacts 41 and when it reaches a predetermined magnitude corresponding to the maximum permissible temperature, it causes the thermally operated contacts 41 to open and the main heating current normally flowing through branch 38 to be broken. The back resistance of the rectifying material 14 is sufficiently high, even at elevated temperatures, so that the heating effect the current is not such as to continue the over-heated condition. The change in current, as any point along the cable overheats, is sufficient to cause the operation of the contacts 41 without the necessity of overheating the whole cable.

As the cable C cools the current flowing through the heater element 43 of the contacts 41 will diminish to a point where the contacts 41 will again close, supplying main heating current to the cable. The cable C may be used as a self-regulating heating element. The total resistance of some rectifying materials such as copper oxide will decrease as the temperature of the rectifying material increases. By utilizing such a material, as any given point along the length of the cable C increases in temperature the total resistance of the rectifying material at that point will decrease. This will cause a decrease in the heating effect at that point, since the change in current will not correspond directly to the change in resistance since the current flowing is determined by the resistance of the length of the conductors 13, 13a and the resistance between the conductors at the given point connected in series. Therefore a change in the resistance at a given point will be a small proportion of the total resistance and the heating effect as measured by $I^2R$ will actually decrease at the point.

The cable C is illustrated in Fig. 6 as incorporated in an electric blanket 45. The cable C in this particular case serves as both the heating conductor and the control element, is distributed throughout the area of the blanket, and is externally connected to a control box 46 which contains the circuit control means for the cable C. When used with blankets or other electrically heated fabric it is desirable to construct the cable C so that it has the same degree of flexibility as the fabric. The use of a pair of ribbon conductors wound on a flexible core as illustrated in Fig. 1 provides an extremely flexible cable which is suitable for use in most fabrics.

Fig. 4 shows a modified form of the temperature sensing element 11 which is generally designated by the reference numeral 48. The temperature sensing element 48 comprises an inner cylindrical conductor 49 and an outer tubular conductor 50 coaxial with the inner conductor 49 and separated therefrom by a layer of rectifying material 51 having a negative temperature coefficient of rectification. The outer conductor 50 may be helically wound upon the inner conductor 49 whose diameter may be such as to provide a very flexible conductor or it may be stranded or woven to provide flexibility. The rectifying material 51 is a substantially continuous layer generally coextensive with the outer conductor 50 and in intimate electrical contact with the inner conductor 49 and the outer conductor 50 throughout its extent.

The temperature sensing element 48 may be helically wound upon a flexible insulating core as in the case of the temperature sensing element 11 and covered with a protective coating of polyethylene or other suitable plastic. If a rigid temperature sensing element is desired the inner conductor 49 may be a rigid conductor. It will be understood that the temperature sensing element 48 may be utilized as a combined heating and temperature sensing device in the manner described for the temperature sensing element 11.

Fig. 5 illustrates an alternative arrangement of a combined heating and temperature sensing device designated generally by the reference numeral 55 which comprises a generally cylindrical conductor 56 having a temperature sensing element 57 wound thereon and separated from the conductor 56 by a layer of insulating material 58. The temperature sensing element 57 may be similar to the temperature sensing element 11 and may comprise opposed conductors 59, 60 separated by a layer of rectifying material 61 having a negative temperature coefficient of rectification. The insulating material 58 may be a ceramic if the combined heating and temperature sensing device 55 is to be a rigid device, or a plastic material if the device is to be flexible. To provide a flexible device the inner conductor 56 may have a sufficiently small diameter to provide a flexible conductor and the conductors 59, 60 may be ribbon conductors. Device 55 may be made into cable form by covering with a protective plastic material or it may be wound upon a core similar to the core 10 of Fig. 1 and then covered with an outer coating of suitable plastic material. While the outer cable covering has been referred to throughout the specification as comprised of a suitable plastic, it will be understood that other suitable dielectric material may be used.

It will be seen from the foregoing that the present invention provides an electrically heated blanket or fabric having a temperature sensing element or a combined temperature sensing and heating element therein which utilizes a rectifying material having a negative temperature coefficient of rectification whereby control currents of relatively large magnitude may be obtained and the cost of the element or device held to a minimum. The characteristics of rectifying materials are such that a wide range of operations may be obtained and the operation of the control circuits adjusted to maintain the desired temperature within the blanket.

While the invention has been shown in several forms, it will be obvious to those skilled in the art that it is not so limited, but is susceptible of various other changes and modifications without departing from the spirit thereof.

What is claimed is:

1. An electrically heated fabric comprising a fabric sheet, a flexible cable temperature sensing element carried by said sheet comprising a pair of parallel flexible conductors and a layer of rectifying material intermediate said conductors, said layer being substantially continuous and in electrical contact with said conductors throughout its extent and said rectifying material having a negative temperature coefficient of rectification whereby its resistance to current in its relatively non-conducting direction decreases with an increase in temperature, means connected to said conductors for applying a potential across said material tending to establish a control current through said material in its relatively non-conducting direction, said control current increasing as the temperature of said material increases, an electric heating element for said fabric sheet, and thermal means actuated by a predetermined magnitude of said control current to deenergize said heating element.

2. An electrically heated fabric comprising a fabric sheet, a flexible combined temperature sensing and heating cable carried by said sheet comprising a pair of parallel flexible conductors and a layer of rectifying material intermediate said conductors, said layer being substantially continuous and in electrical contact with said conductors throughout its extent and said rectifying material having a negative temperature coefficient of rectification whereby its resistance to current in its relatively non-conducting direction varies inversely with temperature, means connected to said conductors for applying an alternating potential across said material to establish a heating current flowing through said material in its relatively conducting direction and tending to establish a control current through said material in its relatively non-conducting direction, said control current depending on the temperature of said material and increasing with an increase in the temperature thereof, and means responsive to a predetermined magnitude of said control current to disconnect said potential from across said material.

3. An electrically heated fabric comprising a fabric sheet, a flexible combined temperature sensing and heating cable carried by said sheet comprising a pair of parallel flexible conductors and a layer of rectifying material intermediate said conductors, said layer being substantially continuous and in electrical contact with said conductors throughout its extent, said rectifying material being comprised of copper oxide, means connected to said conductors for applying an alternating potential across said material to establish a heating current flowing through said material in its relatively conducting direction and tending to establish a control current through said material in its relatively non-conducting direction, and means responsive to a predetermined magnitude of said control current to disconnect said potential from across said material.

4. An electrically heated fabric comprising a fabric sheet, a flexible combined temperature sensing and heating cable carried by said sheet comprising a pair of parallel flexible conductors and a layer of rectifying material intermediate said conductors, said layer being substantially continuous and in electrical contact with said conductors throughout its extent and said rectifying material having a negative temperature coefficient of rectification whereby its resistance to current in its relatively non-conducting direction varies inversely with temperature, means connected to said conductors for applying an alternating potential across said material to establish a heating current flowing through said material in its relatively conducting direction and tending to establish a control current through said material in its relatively non-conducting direction and means responsive to a predetermined magnitude of said control current to disconnect said potential from across said material comprising two parallel connected branches connected in series with one of said conductors, one of said branches including a thermally responsive switch and a first unidirectional conducting device connected in series, the other of said branches including a heating element for said switch and a second unidirectional conducting device connected in series, said first unidirectional conducting device passing current flowing through said rectifying material in its relatively conducting direction and said second unidirectional device passing current flowing through said rectifying material in its relatively non-conducting direction.

5. In a temperature control system for a flexible fabric including heating means, temperature responsive means including a rectifying material disposed in heat transfer relationship with the heating means substantially throughout its extent and having a negative temperature coefficient of rectification, means for establishing a potential across said rectifying material tending to produce an electrical control current therethrough in its relatively non-conducting direction, means energizing the heating means and means responsive to a predetermined magnitude of said control current for substantially reducing the rate of energization of said heating means.

6. In a temperature control and heating system for a bed covering, an elongated electrical conductor and an opposed elongated electrical heating element for the covering, a layer comprising a rectifying material having a negative temperature coefficient of rectification interposed between and in electrical contact with said element and said conductor, circuit means for connecting one side of an alternating power supply to one of said elements and said conductor comprising a two-branch parallel circuit, one branch of said parallel circuit having a first unidirectional conducting device and temperature responsive switch means connected in series and the other branch of said circuit means having a second unidirectional conducting device and a heater element for said switch means connected in series, said first device passing current in the relatively conducting direction of said rectifying material, and said second device passing current in the relatively non-conducting direction of said rectifying material, and means for connecting the other of said element and said conductor to the other side of said power supply.

References Cited in the file of this patent

UNITED STATES PATENTS

| | | |
|---|---|---|
| 1,885,908 | Gilson | Nov. 1, 1932 |
| 1,915,137 | Stevens et al. | June 20, 1933 |
| 2,179,293 | Hein | Nov. 7, 1939 |
| 2,189,617 | Siebert et al. | Feb. 6, 1940 |
| 2,431,261 | Little et al. | Nov. 18, 1947 |
| 2,522,753 | Drobisch | Sept. 19, 1950 |
| 2,565,478 | Crowley | Aug. 28, 1951 |
| 2,581,212 | Spooner et al. | Jan. 1, 1952 |
| 2,611,854 | McNairy | Sept. 23, 1952 |
| 2,673,917 | Woodling | Mar. 30, 1954 |